United States Patent
Meng

(10) Patent No.: US 11,700,612 B2
(45) Date of Patent: *Jul. 11, 2023

(54) CBG-BASED NOMA TRANSMISSION FOR A WIRELESS NETWORK

(71) Applicant: Google LLC, Mountain View, CA (US)

(72) Inventor: Ling-San Meng, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,747

(22) Filed: Jul. 11, 2022

(65) Prior Publication Data

US 2022/0346087 A1    Oct. 27, 2022

Related U.S. Application Data

(63) Continuation of application No. 17/042,792, filed as application No. PCT/US2019/029691 on Apr. 29, 2019, now Pat. No. 11,425,699.

(Continued)

(51) Int. Cl.
*H04W 72/04* (2023.01)
*H04W 72/21* (2023.01)
(Continued)

(52) U.S. Cl.
CPC ........... *H04W 72/21* (2023.01); *H04L 1/1819* (2013.01); *H04L 5/0005* (2013.01);
(Continued)

(58) Field of Classification Search
CPC ......... H04W 72/0413; H04W 72/0446; H04W 72/0453; H04W 72/0466; H04L 1/1819;
(Continued)

(56) References Cited

U.S. PATENT DOCUMENTS 9,131,457 B2    9/2015  Nam et al.
9,712,272 B2    7/2017  Zhu et al.
(Continued)

FOREIGN PATENT DOCUMENTS

CN    104205717    12/2014
CN    104488206    4/2015
(Continued)

OTHER PUBLICATIONS

"3GPP TS 24.501 V16.3.0", 3GPP TS 24.501 version 16.3.0, Dec. 2019, 645 pages.
(Continued)

*Primary Examiner* — Vinncelas Louis
(74) *Attorney, Agent, or Firm* — Colby Nipper PLLC

(57) ABSTRACT

This document discloses procedures and apparatus for code block group (CBG)-based non-orthogonal multiple access (NOMA) transmission for a wireless communication link, such as fifth generation new radio. In aspects, a user equipment (UE) receives a first message including a first configuration for a CBG-based transmission scheme. The UE receives a second message including a second configuration for a NOMA transmission scheme. The UE transmits uplink control information (UCI) to the base station using the NOMA transmission scheme from the second configuration. Further, the UE transmits uplink data associated with the UCI using a CBG-based NOMA transmission scheme based on the first configuration and the second configuration. The UE receives a hybrid automatic retransmission request (HARQ) message including one or more HARQ acknowledgements (ACKs) or negative acknowledgements (NACKs) corresponding to a decoding result of the uplink data.

20 Claims, 6 Drawing Sheets

Related U.S. Application Data

(60) Provisional application No. 62/685,876, filed on Jun. 15, 2018.

(51) Int. Cl.
| | |
|---|---|
| *H04L 1/1812* | (2023.01) |
| *H04L 5/00* | (2006.01) |
| *H04W 72/0446* | (2023.01) |
| *H04W 72/0453* | (2023.01) |
| *H04W 72/044* | (2023.01) |

(52) U.S. Cl.
CPC ....... *H04L 5/0055* (2013.01); *H04W 72/0446* (2013.01); *H04W 72/0453* (2013.01); *H04W 72/0466* (2013.01)

(58) Field of Classification Search
CPC ... H04L 5/0005; H04L 5/0055; H04L 1/1887; H04L 1/1614
See application file for complete search history.

(56) References Cited

U.S. PATENT DOCUMENTS

| | | |
|---|---|---|
| 9,794,924 B2 | 10/2017 | Lee et al. |
| 10,218,422 B2 | 2/2019 | Raghavan et al. |
| 10,701,684 B2 | 6/2020 | Yoo et al. |
| 10,750,488 B2 | 8/2020 | He et al. |
| 10,904,868 B2 | 1/2021 | Lei et al. |
| 11,063,705 B2 | 7/2021 | Chou |
| 11,108,440 B2 | 8/2021 | Cha et al. |
| 11,424,799 B2 | 8/2022 | Meng |
| 11,425,699 B2 | 8/2022 | Meng |
| 11,469,866 B2 | 10/2022 | Wu et al. |
| 2011/0158117 A1 | 6/2011 | Ho et al. |
| 2013/0028213 A1 | 1/2013 | Ko et al. |
| 2015/0195795 A1 | 7/2015 | Loehr et al. |
| 2015/0312074 A1 | 10/2015 | Zhu et al. |
| 2016/0066345 A1 | 3/2016 | Sun et al. |
| 2016/0323832 A1 | 11/2016 | Love et al. |
| 2017/0012754 A1 | 1/2017 | Sun et al. |
| 2017/0078333 A1 | 3/2017 | Tevlin |
| 2017/0251462 A1 | 8/2017 | Chae et al. |
| 2017/0310417 A1 | 10/2017 | Jung et al. |
| 2017/0331573 A1 | 11/2017 | Li |
| 2017/0332358 A1 | 11/2017 | Park et al. |
| 2018/0048348 A1 | 2/2018 | Gau et al. |
| 2018/0049190 A1 | 2/2018 | Abedini et al. |
| 2018/0070274 A1 | 3/2018 | Ode |
| 2018/0070335 A1 | 3/2018 | Amuru et al. |
| 2018/0077685 A1 | 3/2018 | Wu et al. |
| 2018/0115386 A1 | 4/2018 | Shin et al. |
| 2018/0123765 A1 | 5/2018 | Cao et al. |
| 2018/0124684 A1 | 5/2018 | Kwon et al. |
| 2018/0139774 A1 | 5/2018 | Ma et al. |
| 2018/0145797 A1* | 5/2018 | Yeo .................. H04L 1/1812 |
| 2018/0152907 A1 | 5/2018 | Zhang et al. |
| 2018/0167932 A1 | 6/2018 | Papasakellariou |
| 2018/0199359 A1 | 7/2018 | Cao et al. |
| 2018/0270854 A1 | 9/2018 | Lee et al. |
| 2018/0302191 A1 | 10/2018 | Park et al. |
| 2018/0324770 A1 | 11/2018 | Nogami et al. |
| 2018/0337816 A1 | 11/2018 | Herath et al. |
| 2019/0045489 A1 | 2/2019 | He et al. |
| 2019/0053226 A1 | 2/2019 | Xiong et al. |
| 2019/0081657 A1 | 3/2019 | Zeng et al. |
| 2019/0082456 A1 | 3/2019 | Kim et al. |
| 2019/0098657 A1 | 3/2019 | Elbwart et al. |
| 2019/0132076 A1 | 5/2019 | Cheng et al. |
| 2019/0132870 A1 | 5/2019 | Guey et al. |
| 2019/0158338 A1 | 5/2019 | Herath et al. |
| 2019/0174472 A1 | 6/2019 | Lee et al. |
| 2019/0190753 A1 | 6/2019 | Bayesteh et al. |
| 2019/0289628 A1 | 9/2019 | Xiong et al. |
| 2019/0312694 A1 | 10/2019 | Jia et al. |
| 2019/0313402 A1 | 10/2019 | Lei et al. |
| 2019/0363846 A1 | 11/2019 | Lei et al. |
| 2019/0386783 A1 | 12/2019 | Chou |
| 2020/0014457 A1 | 1/2020 | Tang |
| 2020/0059322 A1 | 2/2020 | Lei et al. |
| 2020/0059935 A1 | 2/2020 | Qian et al. |
| 2020/0077402 A1 | 3/2020 | Lei et al. |
| 2020/0092057 A1 | 3/2020 | Herath et al. |
| 2020/0119958 A1 | 4/2020 | Bayesteh et al. |
| 2020/0154442 A1 | 5/2020 | Zhou |
| 2020/0154481 A1 | 5/2020 | Goto et al. |
| 2020/0196335 A1* | 6/2020 | Lei .................. H04L 1/1614 |
| 2020/0213901 A1 | 7/2020 | Yoshimoto et al. |
| 2020/0404634 A1 | 12/2020 | He et al. |
| 2021/0029693 A1 | 1/2021 | Meng |
| 2021/0045181 A1* | 2/2021 | Li .................. H04J 11/00 |
| 2021/0135825 A1 | 5/2021 | Pan et al. |
| 2021/0203465 A1 | 7/2021 | Meng et al. |
| 2021/0211171 A1 | 7/2021 | Meng |
| 2021/0266124 A1 | 8/2021 | Wu et al. |
| 2021/0307003 A1 | 9/2021 | Chou |

FOREIGN PATENT DOCUMENTS

| | | | |
|---|---|---|---|
| CN | 108011696 | 5/2018 | |
| EP | 3068060 | 9/2016 | |
| WO | 2016188312 | 12/2016 | |
| WO | 2017050760 | 3/2017 | |
| WO | WO-2017050760 A1 * | 3/2017 | ......... H04B 1/71072 |
| WO | 2017055271 | 4/2017 | |
| WO | 201702950 | 6/2017 | |
| WO | 2017167198 | 10/2017 | |
| WO | 2017194001 | 11/2017 | |
| WO | 2017209570 | 12/2017 | |
| WO | 2017212104 | 12/2017 | |
| WO | 2018021819 | 2/2018 | |
| WO | 2018031620 | 2/2018 | |
| WO | 2018031770 | 2/2018 | |
| WO | 2018032014 | 2/2018 | |
| WO | 2018038410 | 3/2018 | |
| WO | 2018039160 | 3/2018 | |
| WO | 2018061572 | 4/2018 | |
| WO | 2018062842 | 4/2018 | |
| WO | 2018062976 | 4/2018 | |
| WO | 2018064582 | 4/2018 | |
| WO | 2018084559 | 5/2018 | |
| WO | 2018085045 | 5/2018 | |
| WO | 2018128200 | 7/2018 | |
| WO | 2018130115 | 7/2018 | |
| WO | 2018174649 | 9/2018 | |
| WO | 2019240887 | 12/2019 | |
| WO | 2019240903 | 12/2019 | |
| WO | 2019245662 | 12/2019 | |
| WO | 2019246429 | 12/2019 | |
| WO | 2020033434 | 2/2020 | |
| WO | 2020069090 | 4/2020 | |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.

"3rd Generation Partnership Project; Technical Specification Group Radio Access Network; NG-RAN; Architecture description (Release 15)", 3GPP TS 38.401 V15.0.0, Dec. 2017, 9 Pages.

"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.

"3rd Generation Partnership Project; Technical Specification Group Radio Access Network; NR; Multiplexing and channel coding (Release 15)", 3GPP TS 38.212 V15.2.0, Jun. 2018, 105 pages.

"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.

(56) References Cited

OTHER PUBLICATIONS

"3rd Generation Partnership Project; Technical Specification Group Radio Access Network; NR; Physical channels and modulation (Release 15)", 3GPP TS 38.211 V15.2.0, Jun. 2018, 46 pages.
"3rd Generation Partnership Project; Technical Specification Group Radio Access Network; NR; Physical layer procedures for control (Release 15)", 3GPP TS 38.213 V15.2.0, Jun. 2018, 49 pages.
"3rd Generation Partnership Project; Technical Specification Group Radio Access Network; NR; Physical layer procedures for data (Release 15)", 3GPP TS 38.214 V15.2.0, Jun. 2018, 95 pages.
"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.
"3rd Generation Partnership Project; Technical Specification Group Radio Access Network; Study on Integrated Access and Backhaul; (Release 15)", 3GPP TR 38.874 V0.2.1, May 2018, 19 Pages.
"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"Architecture Description", 3GPP TS 38.401 version 15.2.0 Release 15, Jul. 2018, 40 pages.
"Considerations on Link Rate Adaptation for NOMA", 3GPP TSG RAN WG1 Meeting #93, Busan, Korea, May 2018, 4 pages.
"Considerations on NOMA Procedures", 3GPP TSG RAN WG1 Meeting #93, Busan, Korea, May 2018, 3 pages.
"CU-DU Interface: Overall Categorization of C-Plane and U-Plane", TSG-RAN Working Group 3 meeting #95, Athens, Greece, Feb. 2017, 9 pages.
"Discussion on Categorization of MA Schemes and Target Scenarios", 3GPP TSG RAN WG1 Meeting #86, Gothenburg, Sweden, Aug. 2016, 3 pages.
"Discussion on NOMA Procedure", 3GPP TSG RAN WG1 Meeting #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"Extended European Search Report", EP Application No. 22159471.6, dated May 24, 2022, 9 pages.
"F1 Interface: Radio Resource Configuration Management", TSG-RAN Working Group 3 meeting #96, Hangzhou, China, May 2017, 4 pages.
"Final Office Action", U.S. Appl. No. 16/387,000, dated Nov. 24, 2020, 13 pages.
"Final Report of 3GPP TSG RAN WG1 #86bis v1.0.0", Final Report of 3GPP TSG RAN WG1 #86bis v1.0.0, (Lisbon, Portugal), Oct. 2016, 160 pages.
"Final Report of 3GPP TSG RAN WG1 #92bis v1.0.0AN WG1 #92bis v1.0.0", Final Report of 3GPP TSG RAN WG1 #92bis v1.0.0, (Sanya, China), Apr. 2018, 195 pages.
"Grant-Free UL Transmissions in NR", 3GPP TSG-RAN WG1 #86bis, Lisbon, Portugal, Oct. 2016, 8 pages.
"Grant-less and Non-orthogonal UL Transmissions in NR", 3GPP TSG-RAN WG1 #86, Gothenburg, Sweden, Aug. 2016, 5 pages.
"International Preliminary Report on Patentability", Application No. PCT/US2019/031059, dated Dec. 22, 2020, 11 pages.
"International Preliminary Report on Patentability", Application No. PCT/US2019/045346, dated Nov. 13, 2020, 12 pages.
"International Preliminary Report on Patentability", Application No. PCT/US2019/029691, dated Dec. 15, 2020, 7 pages.
"International Preliminary Report on Patentability", Application No. PCT/US2019/032285, dated Dec. 15, 2020, 7 pages.
"International Preliminary Report on Patentability", Application No. PCT/US2019/038295, dated Dec. 22, 2020, 8 pages.
"International Preliminary Report on Patentability", Application No. PCT/US2019/053105, dated Apr. 8, 2021, 9 pages.
"International Search Report and Written Opinion", Application No. PCT/US2019/029691, dated Jul. 19, 2019, 12 pages.
"International Search Report and Written Opinion", Application No. PCT/US2019/038295, dated Sep. 4, 2019, 14 pages.
"International Search Report and Written Opinion", Application No. PCT/US2019/031059, dated Aug. 19, 2019, 16 pages.
"International Search Report and Written Opinion", Application No. PCT/US2019/045346, dated Oct. 17, 2019, 17 pages.
"International Search Report and Written Opinion", Application No. PCT/US2019/053105, dated Dec. 10, 2019, 17 pages.
"International Search Report and Written Opinion", Application No. PCT/US2019/032285, dated Aug. 14, 2019, 85 pages.
"Key Processing Modules at Transmitter Side for NOMA", 3GPP TSG RAN WG1 Meeting #93, Busan, Korea, May 2018, 11 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"NOMA Related Procedure", 3GPP TSG RAN WG1 Meeting #93, Busan, Korea, May 2018, 8 pages.
"Non-Final Office Action", U.S. Appl. No. 16/387,000, dated Jun. 4, 2020, 10 Pages.
"Non-Final Office Action", U.S. Appl. No. 16/427,712, dated Nov. 4, 2020, 17 pages.
"Notice of Allowance", U.S. Appl. No. 17/059,131, dated May 12, 2022, 11 pages.
"Notice of Allowance", U.S. Appl. No. 17/042,792, date Apr. 12, 2022, 12 pages.
"Notice of Allowance", U.S. Appl. No. 16/387,000, dated Mar. 31, 2021, 8 pages.
"Notice of Allowance", U.S. Appl. No. 17/260,862, dated May 26, 2022, 8 pages.
"On Categorization of MA Schemes for NR", 3GPP TSG-RAN WG1 Meeting #86, Gothenburg, Sweden, Aug. 2016, 2 pages.
"Procedures related consideration to NoMA", 3GPP TSG RAN WG1 Meeting #92bis—R1-1804398, Apr. 2018, 6 pages.
"Receivers for NOMA", 3GPP TSG RAN WG1 Meeting #92, Athens, Greece, Feb. 2018, 8 Pages.
"Status Report to TSG", 3GPP TSG RAN meeting #77—RP-172105, Sep. 2017, 4 pages.
"Summary of [86-18] Email Discussion on Categorization for NR MA Schemes", Oct. 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"Typical multi-user receivers for NOMA", 3GPP TSG RAN WG1 Meeting #92, Athens, Greece, Feb. 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion", Application No. PCT/US2019/045346, dated Jun. 22, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Georgakopoulos, et al., "Preliminary results on multi-antenna access and link enhancements", Jun. 1, 2017, 120 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J. "7 Deployment Scenarios of Private 5G Networks", Netmanias; Retrieved from https://www.netmanias.com/en/post/

(56) References Cited

OTHER PUBLICATIONS blog/14500/5g-edge-kt-sk-telecom/7-deployment-scenarios-of-private-5g-networks, Oct. 21, 2019, 11 pages.

Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.

Ye, Neng et al., "Uplink Nonorthogonal Multiple Access Technologies Toward 5G: A Survey", Hindawi Wireless Communications and Mobile Computing vol. 2018, Article ID 6187580, 26 pages, Jun. 12, 2018, 27 pages.

Yuan, Yifei "NOMA Study in 3GPP for 5G", ISTC 2018, Hong Kong, Dec. 2018, 32 pages.

Yuan, Zhifeng et al., "Blind Multi-User Detection for Autonomous Grant-Free High-Overloading MA Without Reference Signal", ZTE Corporation, South Keji Road, 55, Shenzhen, China, 508118, Dec. 7, 2017, 13 pages.

"Foreign Notice of Allowance", CN Application No. 201980027939.8, dated Jan. 5, 2023, 7 pages.

"Non-Final Office Action", U.S. Appl. No. 17/059,156, filed Nov. 25, 2022, 17 pages.

"Discussion on NoMA related procedure", 3GPP TSG RAN WG1 Meeting #93, R1-1806753, May 2018.

"Foreign Office Action", KR Application No. 10-2021-7000545, dated Apr. 10, 2023, 11 pages.

"Notice of Allowance", U.S. Appl. No. 17/059,156, dated Mar. 13, 2023, 13 pages.

\* cited by examiner

CBG-BASED NOMA TRANSMISSION FOR A WIRELESS NETWORK

CROSS-REFERENCE TO RELATED APPLICATION(S)

This application is a continuation application of U.S. application Ser. No. 17/042,792, filed Sep. 28, 2020, which is a national stage entry of International Application Serial No. PCT/US2019/029691, filed Apr. 29, 2019, which in turn claims priority to U.S. Provisional Application Ser. No. 62/685,876, filed Jun. 15, 2018, the disclosures of which are incorporated herein by reference.

BACKGROUND

In Long Term Evolution (LTE) and LTE Advanced (LTE-A) systems, within each transmission time interval (TTI), up to two transport blocks (TBs) can be delivered to a physical layer and transmitted over a radio interface to a user equipment (UE). The number of TBs transmitted within a TTI depends on the configuration of the multi-antenna transmission scheme. A Turbo coding scheme is employed in LTE/LTE-A as the channel coding scheme. The internal interleaver used in the Turbo coding scheme is only defined for a limited number of code block (CB) sizes, with a maximum block size of 6144 bits. If a TB exceeds the maximum CB size, code block segmentation is applied before the encoding process. Each CB is then independently encoded.

Hybrid automatic retransmission request (HARQ) is a physical layer transmission technique in modern communication systems. With HARQ, upon detecting a transmission error, the receiver requests a retransmission by feeding back a negative acknowledgement (NACK). When receiving the retransmitted copy, the receiver then combines the previous failed block with the retransmitted one, in an attempt to utilize information embedding in both copies.

In LTE/LTE-A systems, if any one of the CBs in a TB fails decoding, a single HARQ NACK is fed back by the receiver. After receiving the HARQ NACK, the transmitter then performs a retransmission by selecting an appropriate redundancy version (RV), assuming the whole TB failed. This is due to the reason that the receiver did not feed back information regarding which CBs have been successfully received, and which CBs failed.

Fifth Generation New Radio (5G NR) supports three usage scenarios: enhanced mobile broadband (eMBB), ultra reliable low latency communications (URLLC), and massive machine type communications (mMTC). For mMTC, a base station is expected to accommodate a very large number of low-cost user equipments (UEs). The data traffic generated by mMTC UEs is expected to be both light and sporadic. As a result, the scheduling grant-based paradigm for uplink (UL) transmissions adopted in LTE is not ideal for mMTC UEs, as the extra cost incurred by the scheduling grants associated with each UL transmission cannot be justified by the precise tuning of the UL resource made by the base station (BS).

Grant-free UL transmission is a paradigm in which the UEs perform UL transmissions autonomously without being scheduled by the base station. The base station then receives the UL transmissions by a predefined detection and/or decoding method. The concept of grant-free transmissions particularly suits the scenario of mMTC. Understanding the potential benefits brought by grant-free UL transmissions, such concept has also been introduced to URLLC. Implementing a unified framework may enable the technique of grant-free transmissions to be applied to all 5G deployment scenarios.

Under the context of grant-free transmissions, a multiple access scheme referred to as non-orthogonal multiple access (NOMA) has been developed. In NOMA, the UEs perform grant-free UL transmissions with resources that are not necessarily orthogonal to each other. The resource used by a UE for NOMA transmission may be termed multiple access (MA) signature, e.g., orthogonal codes, spreading codes, scrambling codes, mapping pattern, etc. In this way, the number of UEs that can be simultaneously supported can be larger as compared with the case where UL resources have to be orthogonal. For UL detection, the BS has to blindly decode all the possible MA signatures since UL transmissions are not pre-scheduled but autonomously made by the UEs. To lower the decoding complexity, the MA signatures can be associated with preambles and/or demodulation reference symbols based on a predefined mapping mechanism. For example, if preambles and MA signatures have a one-to-one mapping, the BS can simply detect the presence of a particular preamble to see if the associated UE made a UL transmission, instead of making a complete decoding attempt.

SUMMARY

This document discloses procedures and apparatus for CBG-based NOMA transmission for a wireless network, such as fifth generation new radio.

This summary is provided to introduce simplified concepts of CBG-based NOMA transmission. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of CBG-based NOMA transmission for a wireless network are described with reference to the following drawings. The same numbers are used throughout the drawings to reference like features and components.

DETAILED DESCRIPTION

Figure 1:
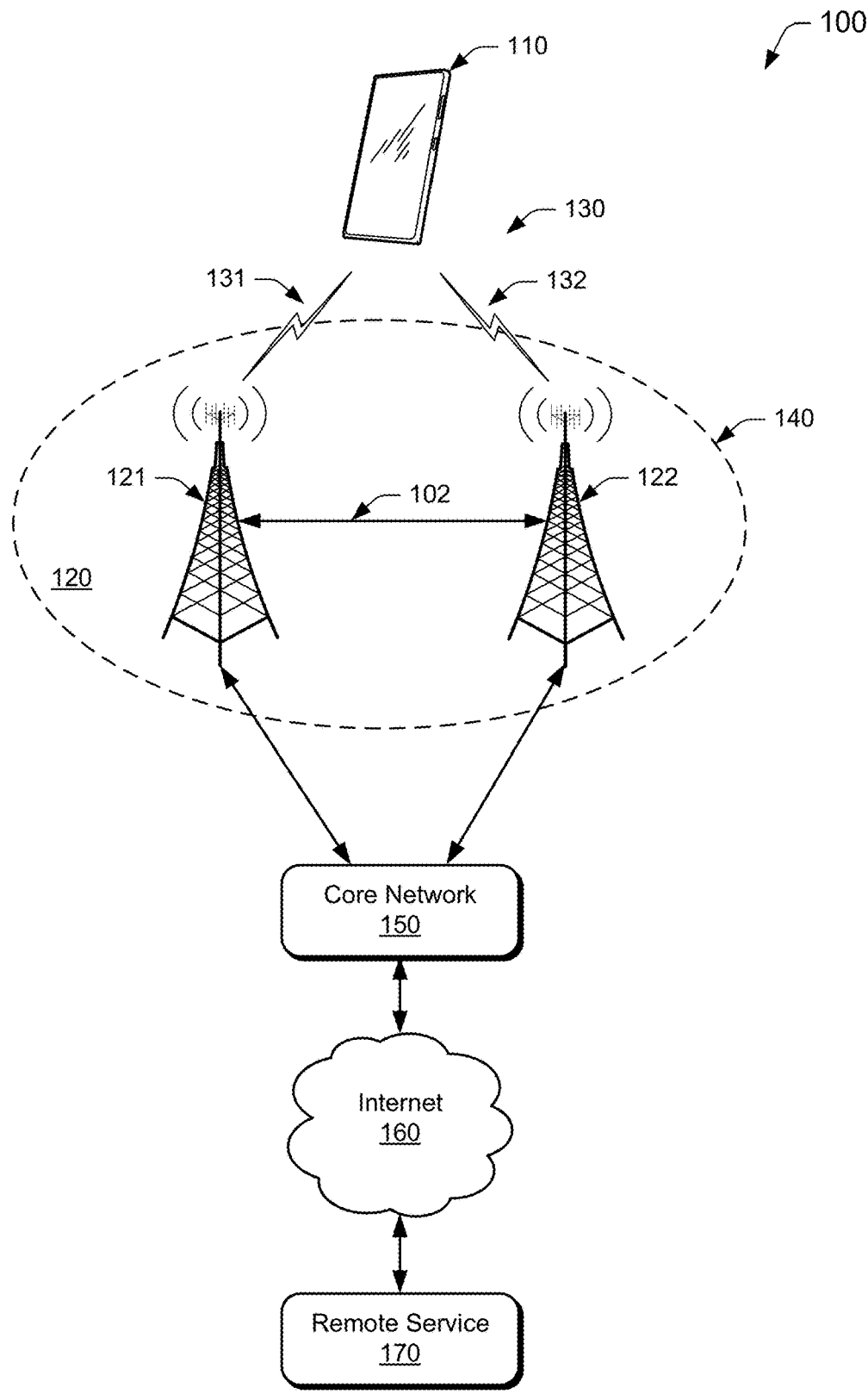
FIG. 1 illustrates an example wireless network system in which various aspects of CBG-based NOMA transmission for a wireless network can be implemented.

Compared with the conventional orthogonal multiple access scheme, non-orthogonal multiple access (NOMA)

transmission is more liable to bursty or non-uniform interference. Also, retransmissions performed by user equipments (UEs) can persistently interfere with one another, which reduces the spectral efficiency of NOMA transmission schemes.

To improve the spectral efficiency of NOMA transmission schemes, code block group (CBG)-based transmission can be employed in NOMA for Fifth Generation New Radio (5G NR) systems. In aspects, one CBG consists of a number of code blocks (CBs) within a transport block (TB). Instead of feeding back a single negative acknowledgement (NACK) if any one of the CBs fails decoding, the receiver indicates which CBGs failed. The transmitter can then perform a retransmission that addresses the failed CBGs only. The overall efficiency thus improves.

In an example, a base station (BS) first instructs a UE to perform CBG-based transmission by at least assigning the UE a maximum number of CBGs. The BS then instructs a UE to perform NOMA transmission by configuring, for the UE, a dedicated MA signature and/or a pool of time-frequency resources. The MA signature can be one or a combination of a bit-interleaving configuration, a bit-scrambling configuration, a modulation-symbol spreading configuration, a modulation-symbol interleaving configuration, and a modulation-symbol scrambling configuration.

To facilitate UE identification, HARQ combining, and adaptive transmission, the UE may transmit uplink control information (UCI) along with its UL data in CBG-based NOMA transmission. In the UCI, the UE specifies one or a combination of its identity, e.g., C-RNTI, modulation and coding scheme (MCS) used for transmitting the UL data, new data indicator (NDI) for indicating whether the UL data is a new transmission or a retransmission, and redundancy version (RV) for correct HARQ combining.

In aspects, the BS may reply to the UE regarding the decoding result of the CBG-base NOMA transmission using a physical channel, e.g., using a downlink control information (DCI). For example, the BS may include a bitmap in a UL grant addressed to the UE, with the bitmap corresponding to binary decoding results of a complete list of CBGs that the UE just transmitted. The bitmap includes an ACK or NACK for each CBG in the bitmap. After receiving the UL grant, the UE may then retransmit those CBGs that are indicated as NACK.

In some instances, the UE may miss one or more of the HARQ feedback messages sent by the BS. Using conventional NOMA transmission, the UE cannot be certain whether it is the BS missing the first UL data transmission made by the UE, or the UE itself missing the HARQ feedback message. If the UE retransmits the same set of CBGs as in the previous transmission, the set of CBGs will likely be different than what the BS is expecting, which can cause errors and reduce efficiency. To increase efficiency and reduce errors, CBG transmission information (CBGTI) can be included in the UCI sent by the UE for indicating to the BS which CBGs are being transmitted or retransmitted in the UL data. The BS can then implement a HARQ-combining scheme (e.g., Chase combining or incremental redundancy combining) to combine successfully-decoded CBGs (CBGs indicated as ACK) from the first UL data transmission with successfully-decoded retransmitted CBGs in the retransmission (e.g., transmission of second UL data).

In aspects, a method for communicating with a base station is disclosed. The method includes a UE receiving, from the base station, a first message including a first configuration for a code block group (CBG)-based transmission scheme. The method also includes the UE receiving, from the base station, a second message including a second configuration for a non-orthogonal multiple access (NOMA) transmission scheme. In addition, the method includes the UE transmitting uplink control information (UCI) to the base station using the NOMA transmission scheme from the second configuration in the second message. Also, the method includes the UE transmitting, to the base station, uplink data associated with the UCI using a CBG-based NOMA transmission scheme based on the first configuration in the first message and the second configuration in the second message. The method further includes the UE receiving, from the base station, a hybrid automatic retransmission request (HARQ) message including one or more HARQ acknowledgements (ACKs) or negative acknowledgements (NACKs) corresponding to a decoding result of the uplink data.

In aspects, a method for configuring and communicating with a UE is disclosed. The method includes a base station transmitting a first message including a first configuration for a code block group (CBG)-based transmission scheme. The method also includes the base station transmitting a second message including a second configuration for a non-orthogonal multiple access (NOMA) transmission scheme. In addition, the method includes the base station receiving uplink control information (UCI) transmitted by the UE using the NOMA transmission scheme. The method also includes the base station decoding the uplink data associated with the UCI to provide a decoding result, the decoding of the uplink data including decoding each CBG of the uplink data. The method further includes the base station receiving uplink data associated with the UCI transmitted by the UE using a CBG-based NOMA transmission scheme. Also, the method includes the base station transmitting a hybrid automatic retransmission request (HARQ) message corresponding to a decoding result of the uplink data for receipt by the UE, the HARQ message including at least one HARQ acknowledgment (ACK) or negative acknowledgment (NACK).

FIG. 1 illustrates an example environment 100, which includes a user equipment 110 (UE 110) that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Figure 2:
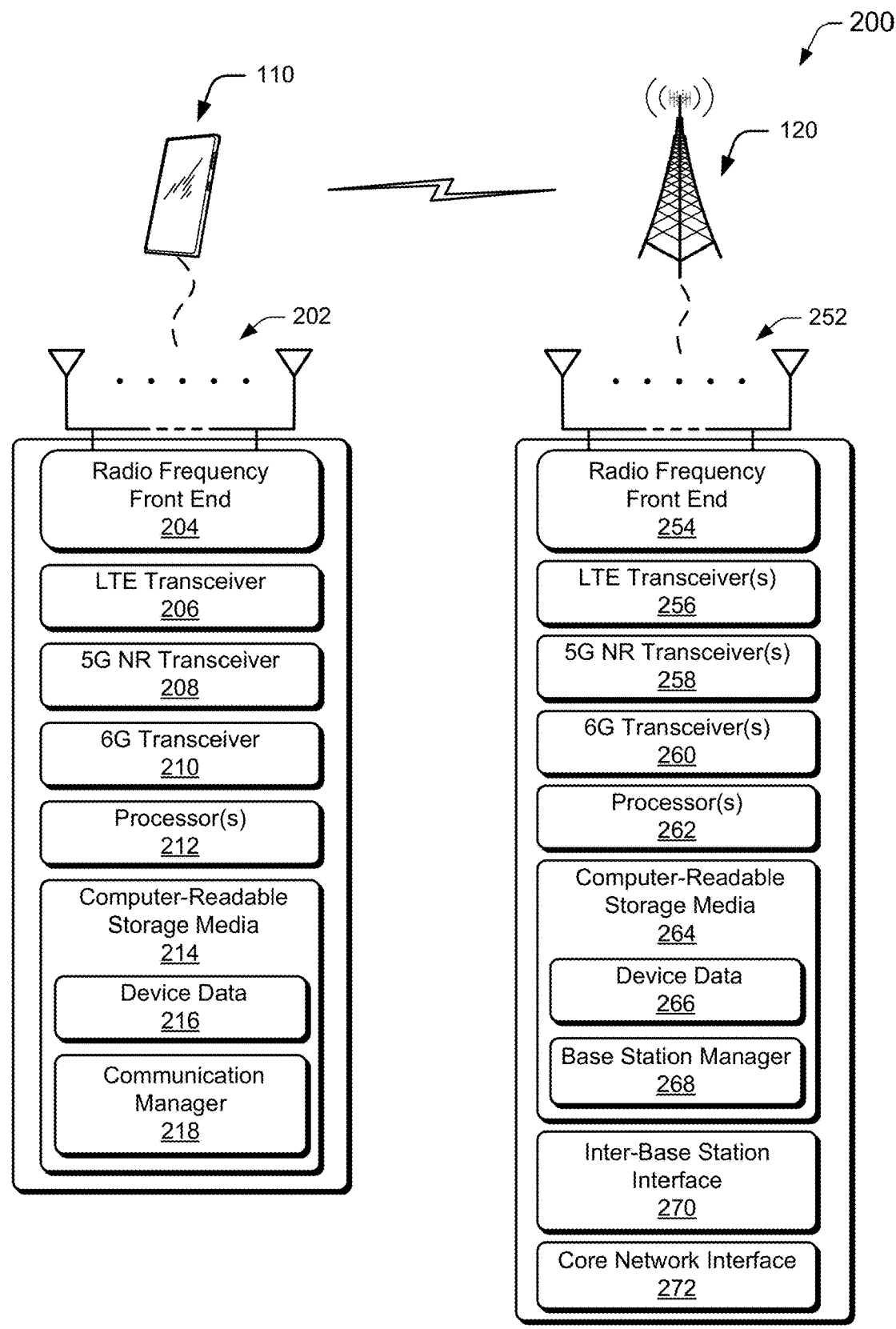
FIG. 2 illustrates an example device diagram that can implement various aspects of CBG-based NOMA transmission for a wireless network.

FIG. 2 illustrates an example device diagram 200 of the UE 110 and the base stations 120. The UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the UE 110 can couple or connect the LTE transceiver 206, the 5G NR transceiver 208, and the 6G transceiver 210 to the antennas 202 to facilitate various types of wireless communication. The antennas 202 of the UE 110 may include an array of multiple antennas that are configured similarly to or differently from each other.

The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE, 5G NR, and 6G communication standards.

The UE 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 includes user data, multimedia data, beamforming codebooks, applications, and/or an operating system of the UE 110, which are executable by processor(s) 212 to enable user-plane communication, control-plane signaling, and user interaction with the UE 110.

In some implementations, the CRM 214 may also include a communication manager 218. Alternately or additionally, the communication manager 218 may be implemented in whole or part as hardware logic or circuitry integrated with or separate from other components of the UE 110. In at least some aspects, the communication manager 218 can communicate with the antennas 202, the RF front end 204, the LTE transceiver 206, the 5G NR transceiver 208, and/or the 6G transceiver 210 to monitor the quality of the wireless communication links 130. Additionally, the communication manager 218 can configure the antennas 202, the RF front end 204, the LTE transceiver 206, the 5G NR transceiver, and/or the 6G transceiver 210 to implement the techniques for CBG-based NOMA transmission described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other.

The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the UE 110.

CRM 264 also includes a base station manager 268. Alternately or additionally, the base station manager 268 may be implemented in whole or part as hardware logic or circuitry integrated with or separate from other components of the base stations 120. In at least some aspects, the base station manager 268 configures the LTE transceivers 256, the 5G NR transceivers 258, and the 6G transceiver(s) 260 for communication with the UE 110, as well as communication with a core network, such as the core network 150, and routing user-plane and control-plane data for joint communication.

The base stations 120 include an inter-base station interface 270, such as an Xn and/or X2 interface, which the base station manager 268 configures to exchange user-plane and control-plane data between other base stations 120, to manage the communication of the base stations 120 with the UE 110. The base stations 120 include a core network interface 272 that the base station manager 268 configures to exchange user-plane and control-plane data with core network functions and/or entities.

Figure 3:
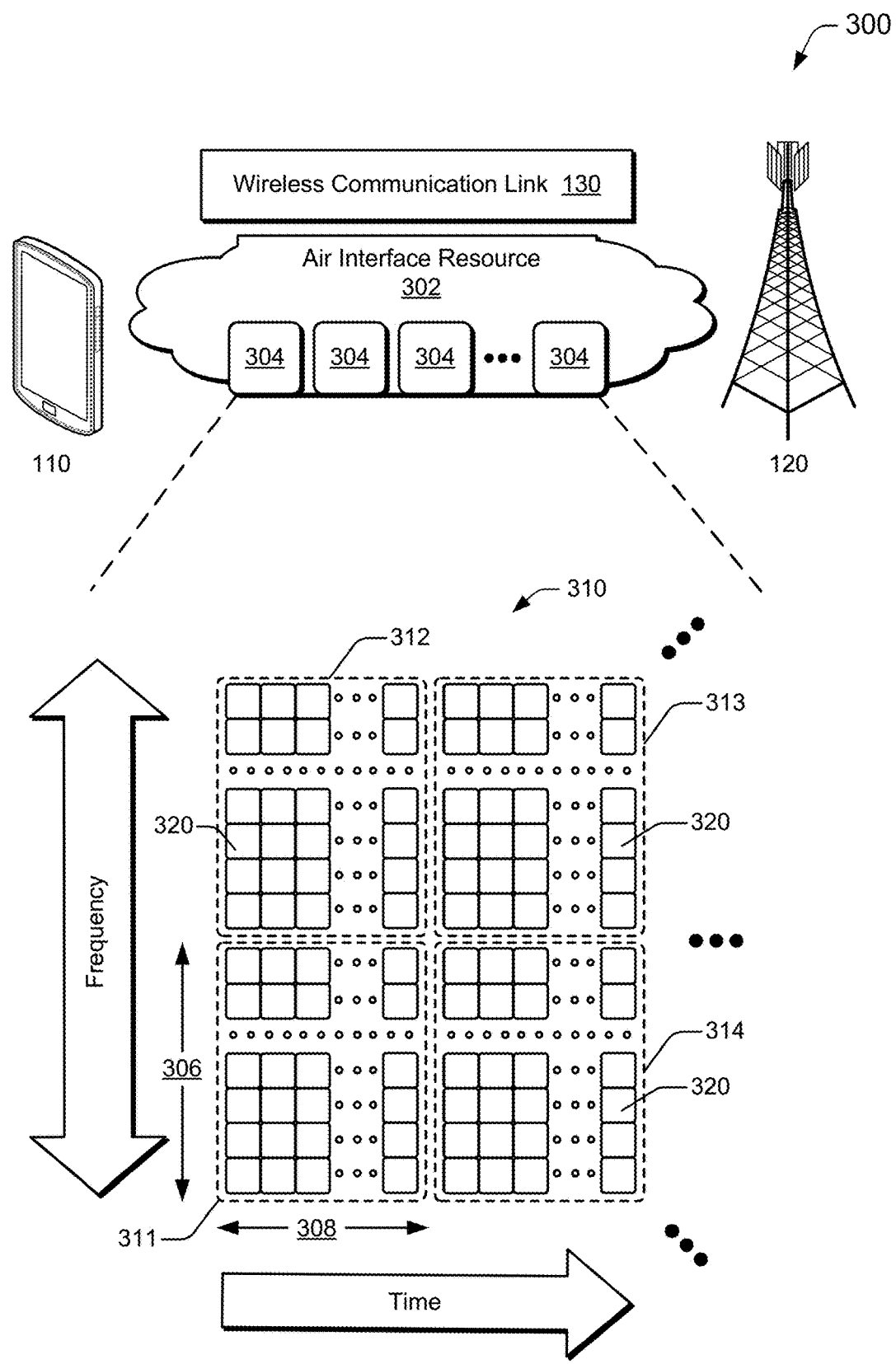
FIG. 3 illustrates an air interface resource that extends between a user equipment and a base station and with which various aspects the described techniques can be implemented.

FIG. 3 illustrates an air interface resource that extends between a user equipment and a base station and with which various aspects of a CBG-based NOMA transmission can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 268 (shown in FIG. 2) may determine a respective data-rate, type of information, or amount of information (e.g., data or control information) to be communicated (e.g., transmitted) by the user equipment 110. For example, the base station manager 268 can determine that each user equipment 110 is to transmit at a different respective data rate or transmit a different respective amount of information. The base station manager 268 then allocates one or more resource blocks 310 to each user equipment 110 based on the determined data rate or amount of information.

Additionally, or in the alternative to block-level resource grants, the base station manager 268 may allocate resource units at an element-level. Thus, the base station manager 268 may allocate one or more resource elements 320 or individual subcarriers to different user equipment 110. By so doing, one resource block 310 can be allocated to facilitate network access for multiple user equipment 110. Accordingly, the base station manager 268 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

Example Procedures

Figure 4:
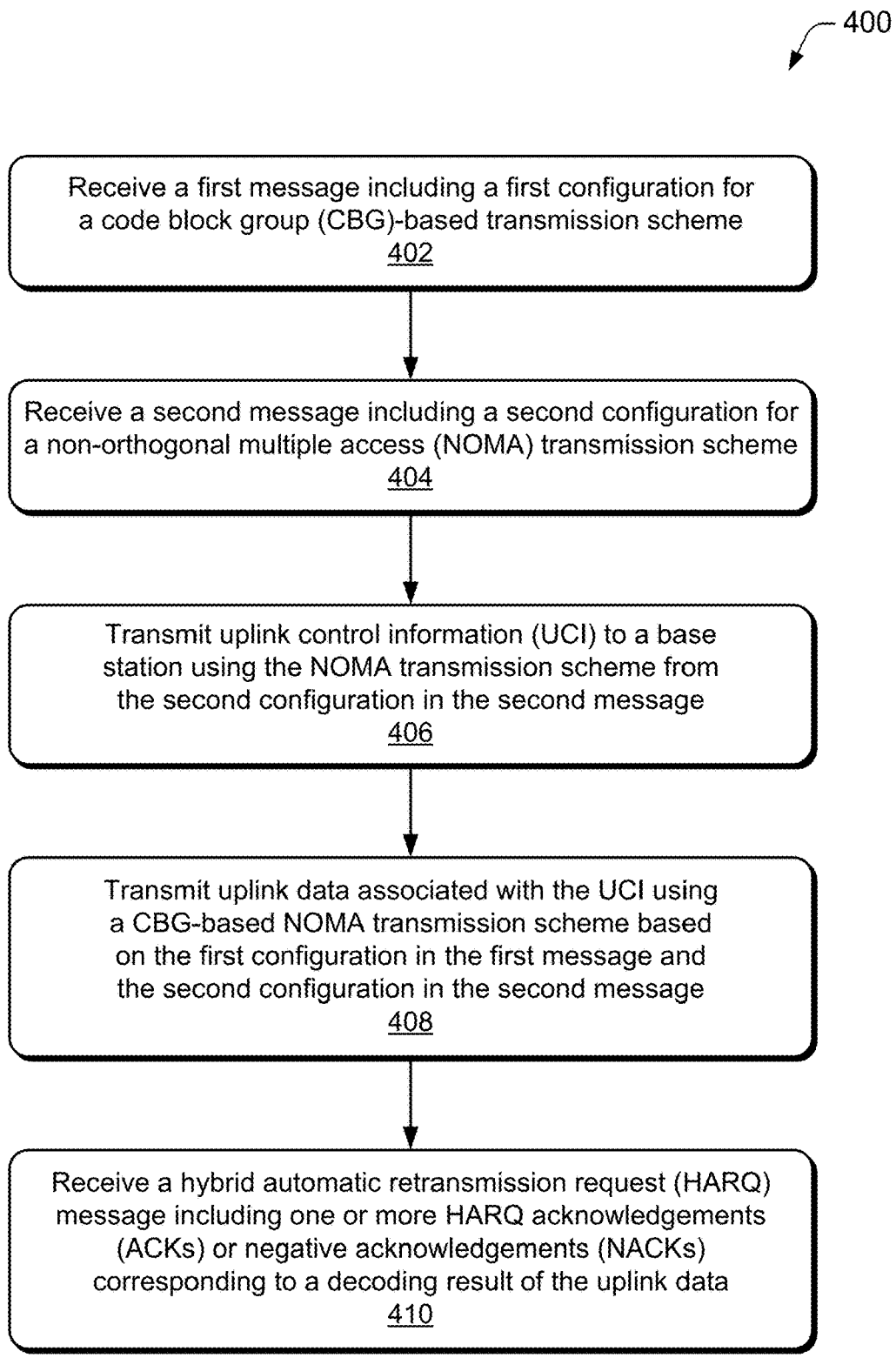
FIG. 4 illustrates an example method of CBG-based NOMA transmission for a wireless network in accordance with aspects of the techniques described herein.
Figure 5:
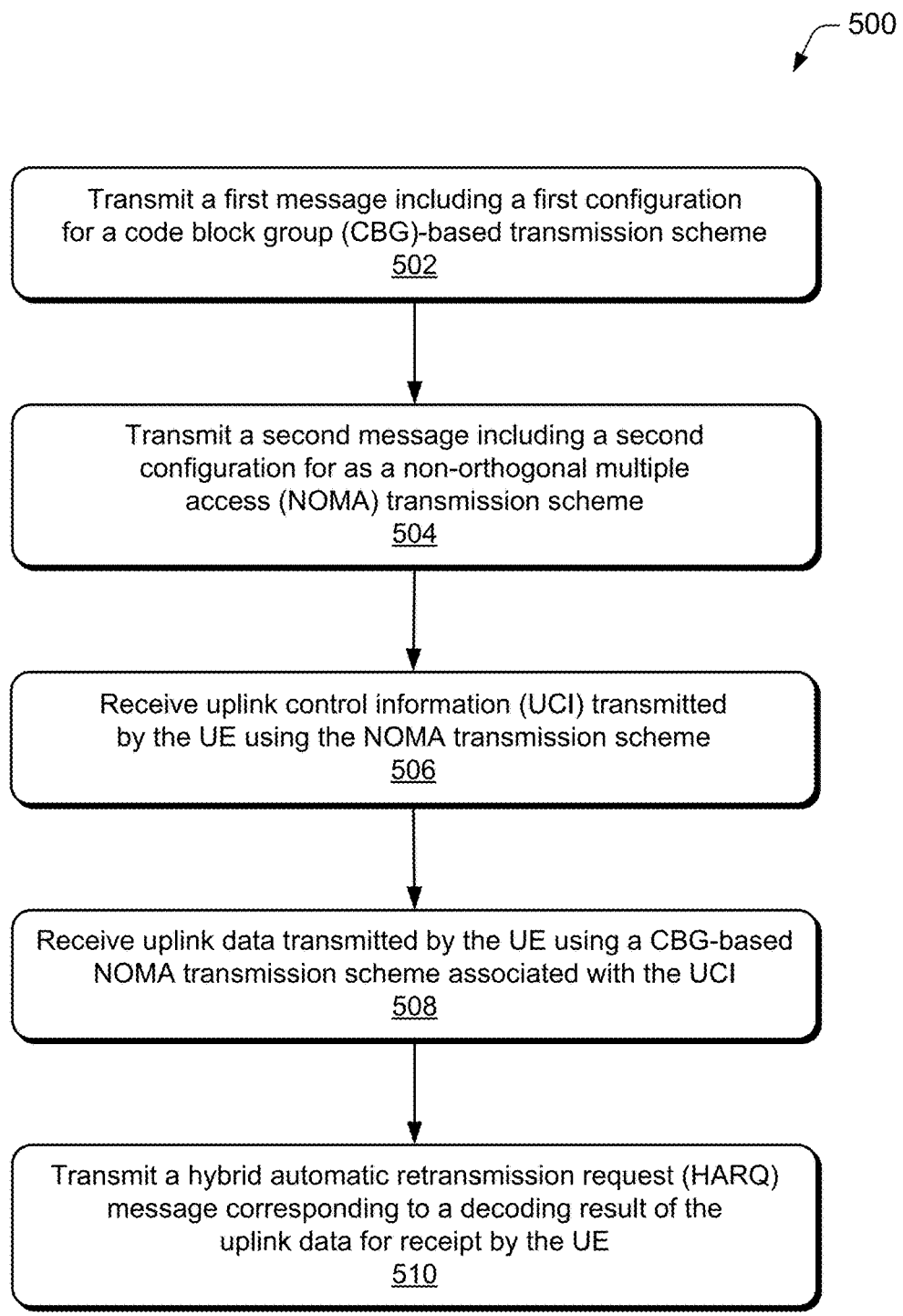
FIG. 5 illustrates an example method of CBG-based NOMA transmission for a wireless network in accordance with aspects of the techniques described herein.

Example methods 400 and 500 are described with reference to FIGS. 4 and 5, respectively, in accordance with one or more aspects of CBG-based NOMA transmission. The method 400, described with respect to FIG. 4, is performed by a UE 110 for communicating with a base station. The method 500, described with respect to FIG. 5, is performed by a base station 120 for configuring and communicating with a UE.

FIG. 4 illustrates an example method of CBG-based NOMA transmission in accordance with aspects of the techniques described herein. The order in which the method blocks are described are not intended to be construed as a limitation, and any number of the described method blocks can be combined in any order to implement a method, or an alternate method.

At block 402, the UE receives, from the base station, a first message including a first configuration for a code block group (CBG)-based transmission scheme. For example, UE 110 receives the first message from base station 120. The first message may assign the UE a maximum number of CBGs.

At block 404, the UE receives, from the base station, a second message including a second configuration for a non-orthogonal multiple access (NOMA) transmission scheme. For example, the UE 110 receives the second message from the base station 120. The second message may include a dedicated multiple access signature and/or a pool of time-frequency resources, as described above.

At block 406, the UE transmits uplink control information (UCI) to the base station using a NOMA transmission scheme from the second configuration in the second message. For example, the UE 110 specifies its identity in the UCI and utilizes NOMA transmission to transmit the UCI to the base station 120.

At block 408, the UE transmits to the base station uplink data associated with the UCI using a CBG-based NOMA transmission based on the first configuration in the first message and the second configuration in the second message. For example, the UE 110 transmits the uplink data to the base station 120 using the CBG-based NOMA transmission scheme.

At block 410, the UE receives, from the base station, a hybrid automatic retransmission request (HARQ) message that includes one or more HARQ acknowledgements (ACKs) or negative acknowledgements (NACKs) corresponding to a decoding result of the uplink data. For example, the UE 110 may receive the HARQ message from the base station 120. The HARQ message may include any number of HARQ ACKs and HARQ NACKs, such as a number equal to the maximum number of CBGs.

FIG. 5 illustrates an example method 500 for configuring and communicating with a UE. The order in which the method blocks are described are not intended to be construed as a limitation, and any number of the described method blocks can be combined in any order to implement a method, or an alternate method.

At block 502, a base station transmits a first message including a first configuration for a code block group (CBG)-based transmission scheme. For example, the base station 120 may transmit the first message to the UE 110 to instruct the UE to perform CBG-based transmission.

At block 504, the base station transmits a second message including a second configuration for a non-orthogonal multiple access (NOMA) transmission scheme. For example, the base station 120 may transmit the second message to the UE 110 to instruct the UE to perform NOMA transmission. As described above, the base station 120 may assign a dedicated multiple access signature or a pool of time-frequency resources to the UE 110 using the second message.

At block 506, the base station receives uplink control information (UCI) transmitted by the UE is received using the NOMA transmission scheme. For example, the base station 120 may receive the UCI, from the UE, formatted in the NOMA transmission scheme.

At block 508, the base station receives uplink data transmitted by the UE using CBG-based NOMA transmission scheme associated with the UCI. For example, the base station 120 may receive the uplink data, from the UE 110, formatted in the CBG-based NOMA transmission scheme. The base station 120 also decodes the uplink data associated with the UCI to provide a decoding result. In aspects, the decoding of the uplink data includes decoding each CBG of the uplink data.

At block 510, the base station transmits a hybrid automatic retransmission request (HARQ) message corresponding to a decoding result of the uplink data for receipt by the UE. For example, the base station 120 may transmit the HARQ message to the UE 110. The HARQ message may include at least one HARQ acknowledgment (ACK) or negative acknowledgment (NACK), which are usable by the UE 110 to determine which CBGs failed transmission and require re-transmission.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Example Device

Figure 6:
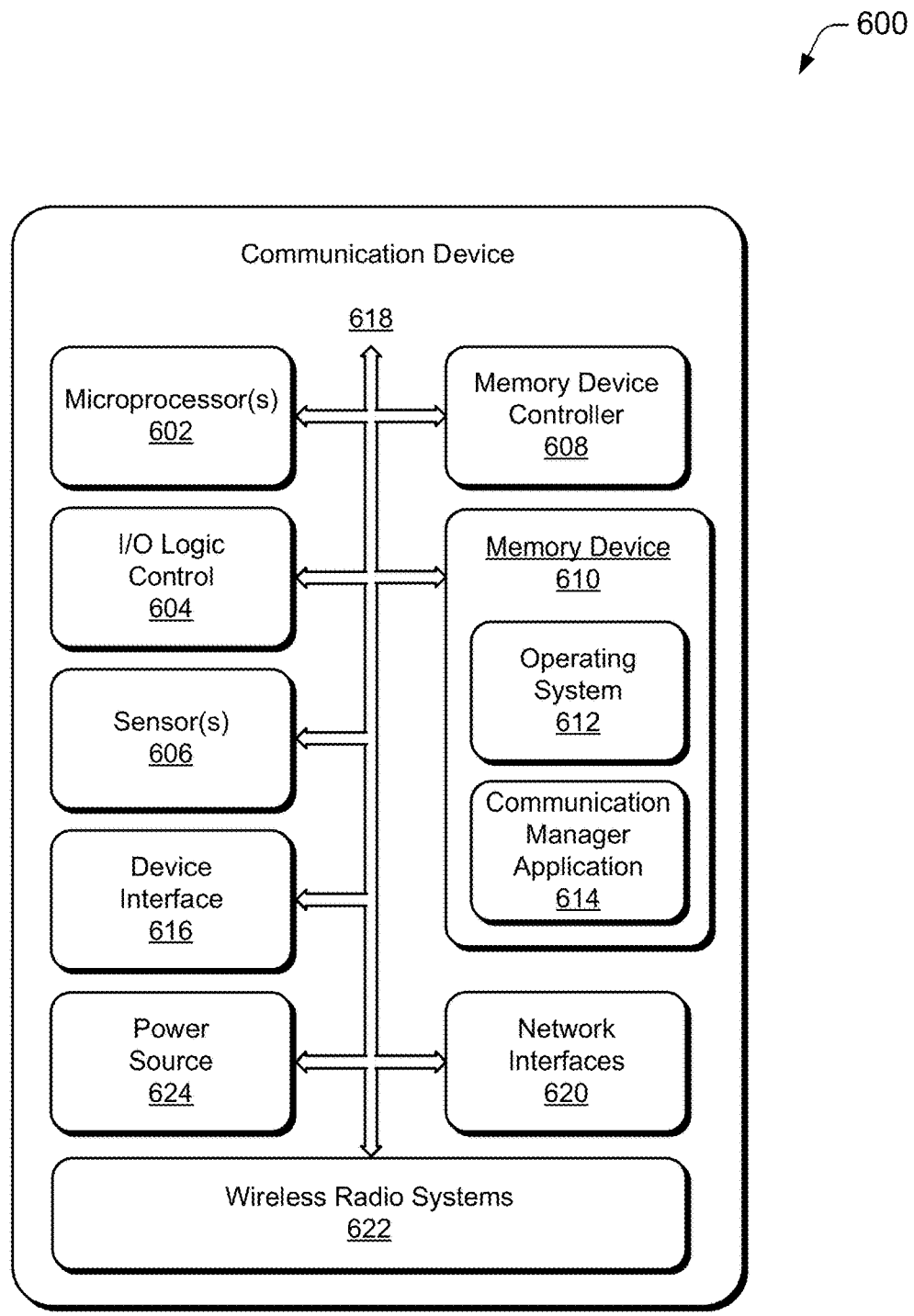
FIG. 6 illustrates an example communication device that can be implemented in a wireless network environment in accordance with one or more aspects of the techniques described herein.

FIG. 6 illustrates an example communication device 600 that can be implemented as the user equipment 110 in accordance with one or more aspects of CBG-based NOMA Transmission for a wireless network as described herein. The example communication device 600 may be any type of mobile communication device, computing device, client device, mobile phone, tablet, communication, entertainment, gaming, media playback, and/or other type of device.

The communication device 600 can be integrated with electronic circuitry, microprocessors, memory, input output (I/O) logic control, communication interfaces and components, as well as other hardware, firmware, and/or software to implement the device. Further, the communication device 600 can be implemented with various components, such as with any number and combination of different components as further described with reference to the user equipment 110 shown in FIGS. 1 and 2.

In this example, the communication device 600 includes one or more microprocessors 602 (e.g., microcontrollers or digital signal processors) that process executable instructions. The device also includes an input-output (I/O) logic control 604 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 606 can be implemented to detect various properties such as acceleration, temperature, humidity, supplied power, proximity, external motion, device motion, sound signals, ultrasound signals, light signals, global-positioning-satellite (GPS) signals, radio frequency (RF), other electromagnetic signals or fields, or the like. As such, the sensors 606 may include any one or a combination of temperature sensors, humidity sensors, accelerometers, microphones, optical sensors up to and including cameras (e.g., charged coupled-device or video cameras), active or passive radiation sensors, GPS receivers, and radio frequency identification detectors.

The communication device 600 includes a memory device controller 608 and a memory device 610 (e.g., the computer-readable storage media 214), such as any type of a nonvolatile memory and/or other suitable electronic data storage device. The communication device 600 can also include various firmware and/or software, such as an operating system 612 that is maintained as computer executable instructions by the memory and executed by a microprocessor. The device software may also include a communication manager application 614 that implements aspects of CBG-based NOMA transmission for a wireless network. The communication manager application 614 may be implemented as the communication manager 218 of the UE 110 or as the base station manager 268 of the base station 120. The computer-readable storage media described herein excludes propagating signals.

The device interface 616 may receive input from a user and/or provide information to the user (e.g., as a user interface), and a received input can be used to determine a setting. The device interface 616 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 616 may also receive inputs from any number of peripherals, such as buttons, a keypad, a switch, a microphone, and an imager (e.g., a camera device).

The communication device 600 can include network interfaces 620, such as a wired and/or wireless interface for communication with other devices via Wireless Local Area Networks (WLANs), wireless Personal Area Networks (PANs), and for network communication, such as via the Internet. The network interfaces 620 may include Wi-Fi, Bluetooth®, BLE, and/or IEEE 802.15.4. The communication device 600 also includes wireless radio systems 622 for wireless communication with cellular and/or mobile broadband networks. Each of the different radio systems can include a radio device, antenna, and chipset that is implemented for a particular wireless communications technology, such as the antennas 202, the RF front end 204, the LTE transceiver 206, and/or the 5G NR transceiver 208. The communication device 600 also includes a power source 624, such as a battery and/or to connect the device to line voltage. An AC power source may also be used to charge the battery of the device.

Although aspects of CBG-based NOMA transmission for a wireless network have been described in language specific to features and/or methods, the subject of the appended claims is not necessarily limited to the specific features or methods described. Rather, the specific features and methods are disclosed as example implementations of CBG-based NOMA transmission for a wireless network, and other equivalent features and methods are intended to be within the scope of the appended claims. Further, various different aspects are described, and it is to be appreciated that each described aspect can be implemented independently or in connection with one or more other described aspects.

What is claimed is:

1. A method for a user equipment, (UE) to communicate with a base station, the method comprising:
   receiving, by the UE and from the base station, a first message including a first configuration for a code block group-based (CBG-based) transmission scheme;
   receiving, by the UE and from the base station, a second message including a second configuration for a non-orthogonal multiple access (NOMA) transmission scheme;
   transmitting, by the UE and to the base station, uplink data using a CBG-based NOMA transmission scheme based on the first configuration in the first message and the second configuration in the second message;
   receiving, by the UE and from the base station, a decoding result of the CBG-based NOMA transmission, the decoding result including an indication of which CBGs failed to be decoded by the base station; and
   determining that the CBGs that failed to be decoded require re-transmission.

2. The method according to claim 1, further comprising: retransmitting, by the UE and to the base station, only the CBGs indicated in the decoding result as having failed to be decoded.

3. The method according to claim 1, further comprising:
   transmitting, by the UE and to the base station, uplink control information (UCI) using the NOMA transmission scheme, and
   wherein transmitting uplink data using the CBG-based NOMA transmission scheme includes transmitting uplink data associated with the UCI.

4. The method according to claim 3, wherein the UCI specifies one or more of: an identity of the UE; a modulation and coding scheme (MCS) to be used for transmitting the uplink data; a new data indicator (NDI) for indicating whether the uplink data is a new transmission or a retransmission; and a redundancy version (RV) for correct Hybrid Automatic Retransmission Request (HARQ) combining.

5. The method according to claim 4, wherein the UCI specifies an identity of the UE, and the identity of the UE is a Cell Radio Network Temporary Identifier (C-RNTI) of the UE.

6. The method according to claim 3, wherein the UCI comprises CBG transmission information (CBGTI) indicating which CBGs are transmitted in uplink data associated with the UCI.

7. The method according to claim 1, wherein the decoding result is received in a downlink control information (DCI) message, and optionally the DCI message is an uplink grant message.

8. The method according to claim 7, wherein the uplink grant message comprises a bitmap corresponding to binary decoding results of a complete list of CBGs transmitted by the UE in the uplink data.

9. The method according to claim 8, wherein the bitmap includes an acknowledgement (ACK) or a negative acknowledgement (NACK) for each CBG in the bitmap, the ACK corresponding to CBGs that have been successfully decoded and the NACK corresponding to CBGs that failed to be decoded.

10. A user equipment (UE) comprising:
    a hardware-based transceiver;
    a processor; and
    a computer-readable storage media comprising instructions executable by the processor to configure the UE to use the hardware-based transceiver to:
      receive, from a base station, a first message including a first configuration for a code block group-based (CBG-based) transmission scheme;
      receive, from the base station, a second message including a second configuration for a non-orthogonal multiple access (NOMA) transmission scheme;
      transmit, to the base station, uplink data using a CBG-based NOMA transmission scheme based on the first configuration in the first message and the second configuration in the second message;
      receive, from the base station, a decoding result of the CBG-based NOMA transmission, the decoding result including an indication of which CBGs failed to be decoded by the base station; and
      determine that the CBGs that failed to be decoded require re-transmission.

11. The user equipment according to claim 10, the instructions further executable by the processor to configure the UE to use the hardware-based transceiver to:

retransmit, to the base station, only the CBGs indicated in the decoding result as having failed to be decoded.

12. A method for a base station to communicate with a user equipment, UE, the method comprising:
   transmitting, by the base station, a first message including a first configuration for a code block group-based (CBG-based) transmission scheme;
   transmitting, by the base station, a second message including a second configuration for a non-orthogonal multiple access (NOMA) transmission scheme;
   receiving, by the base station and from the UE, uplink data transmitted by the UE using a CBG-based NOMA transmission scheme based on the first configuration in the first message and the second configuration in the second message;
   decoding each CBG of the uplink data to provide a decoding result, the decoding result including an indication of which, if any, of the CBGs failed to be decoded; and
   transmitting, by the base station and to the UE, the decoding result.

13. The method according to claim 12, further comprising:
   receiving, by the base station and from the UE, only CBGs indicated in the decoding result as having failed to be decoded.

14. The method according to claim 12, further comprising:
   receiving, by the base station, uplink control information (UCI) transmitted by the UE using the NOMA transmission scheme, and
   wherein receiving uplink data transmitted by the UE using the CBG-based NOMA transmission scheme includes receiving uplink data associated with the UCI.

15. The method according to claim 12, wherein the decoding result is transmitted in a downlink control information, DCI, message.

16. The method according to claim 15, wherein the DCI message is an uplink grant message.

17. The method according to claim 16, wherein comprises a bitmap corresponding to binary decoding results of a complete list of CBGs transmitted by the UE in the uplink data.

18. The method according to claim 17, wherein the bitmap includes an acknowledgement (ACK) or a negative acknowledgement (NACK) for each CBG in the bitmap, the ACK corresponding to CBGs that have been successfully decoded and the NACK corresponding to CBGs that have failed to be decoded.

19. A base station comprising:
   a hardware-based transceiver;
   a processor; and
   a computer-readable storage media comprising instructions executable by the processor to configure the base station to use the hardware-based transceiver to:
      transmit, to a user equipment (UE) a first message including a first configuration for a code block group-based (CBG-based) transmission scheme;
      transmit a second message including a second configuration for a non-orthogonal multiple access (NOMA) transmission scheme;
      receive, from the UE, uplink data transmitted by the UE using a CBG-based NOMA transmission scheme based on the first configuration in the first message and the second configuration in the second message;
      decode each CBG of the uplink data to provide a decoding result, the decoding result including an indication of which, if any, of the CBGs failed to be decoded; and
      transmit, to the UE, the decoding result.

20. The base station according to claim 19, the instructions further executable by the processor to configure the base station to use the hardware-based transceiver to:
   receive, from the UE, only CBGs indicated in the decoding result as having failed to be decoded.

* * * * *